United States Patent
Yin et al.

(10) Patent No.: US 12,086,539 B2
(45) Date of Patent: Sep. 10, 2024

(54) SYSTEM AND METHOD FOR NATURAL LANGUAGE PROCESSING USING NEURAL NETWORK WITH CROSS-TASK TRAINING

(71) Applicant: Salesforce, Inc., San Francisco, CA (US)

(72) Inventors: Wenpeng Yin, Palo Alto, CA (US); Nazneen Rajani, Mountain View, CA (US); Richard Socher, Menlo Park, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 899 days.

(21) Appl. No.: 17/093,478

(22) Filed: Nov. 9, 2020

(65) Prior Publication Data

US 2021/0174204 A1    Jun. 10, 2021

Related U.S. Application Data

(60) Provisional application No. 62/945,789, filed on Dec. 9, 2019.

(51) Int. Cl.
*G06F 40/20* (2020.01)
*G06F 16/33* (2019.01)
*G06F 16/332* (2019.01)
*G06F 40/279* (2020.01)
(Continued)

(52) U.S. Cl.
CPC .......... *G06F 40/20* (2020.01); *G06F 16/3329* (2019.01); *G06F 16/3344* (2019.01); *G06F 40/279* (2020.01); *G06F 40/30* (2020.01); *G06N 3/08* (2013.01)

(58) Field of Classification Search
None
See application file for complete search history.

(56) References Cited

U.S. PATENT DOCUMENTS

| | | | |
|---|---|---|---|
| 10,282,663 | B2 | 5/2019 | Socher et al. |
| 10,346,721 | B2 | 7/2019 | Albright et al. |
| 10,474,709 | B2 | 11/2019 | Paulus |

(Continued)

OTHER PUBLICATIONS

Bansal et al., "Learning to Few-Shot Learn Across Diverse Natural Language Classification Tasks," CoRR, arXiv:1911.03863v1 [cs.CL], Nov. 10, 2019.

(Continued)

*Primary Examiner* — Shaun Roberts
(74) *Attorney, Agent, or Firm* — Haynes and Boone, LLP

(57) ABSTRACT

A method for using a neural network model for natural language processing (NLP) includes receiving training data associated with a source domain and a target domain; and generating one or more query batches. Each query batch includes one or more source tasks associated with the source domain and one or more target tasks associated with the target domain. For each query batch, class representations are generated for each class in the source domain and the target domain. A query batch loss for the query batch is generated based on the corresponding class representations. An optimization is performed on the neural network model by adjusting its network parameters based on the query batch loss. The optimized neural network model is used to perform one or more new NLP tasks.

20 Claims, 8 Drawing Sheets

(51) Int. Cl.
G06F 40/30 (2020.01)
G06N 3/08 (2023.01)

(56) References Cited

U.S. PATENT DOCUMENTS

| | | |
|---|---|---|
| 10,521,465 B2 | 12/2019 | Paulus |
| 10,542,270 B2 | 1/2020 | Zhou et al. |
| 10,546,217 B2 | 1/2020 | Albright et al. |
| 10,558,750 B2 | 2/2020 | Lu et al. |
| 10,565,305 B2 | 2/2020 | Lu et al. |
| 10,565,306 B2 | 2/2020 | Lu et al. |
| 10,565,318 B2 | 2/2020 | Bradbury |
| 10,565,493 B2 | 2/2020 | Merity et al. |
| 10,573,295 B2 | 2/2020 | Zhou et al. |
| 10,592,767 B2 | 3/2020 | Trott et al. |
| 10,699,060 B2 | 6/2020 | McCann |
| 10,747,761 B2 | 8/2020 | Zhong et al. |
| 10,776,581 B2 | 9/2020 | McCann et al. |
| 10,783,875 B2 | 9/2020 | Hosseini-Asl et al. |
| 10,817,650 B2 | 10/2020 | McCann et al. |
| 10,839,284 B2 | 11/2020 | Hashimoto et al. |
| 10,846,478 B2 | 11/2020 | Lu et al. |
| 10,902,289 B2 | 1/2021 | Gao et al. |
| 10,909,157 B2 | 2/2021 | Paulus et al. |
| 10,929,607 B2 | 2/2021 | Zhong et al. |
| 10,958,925 B2 | 3/2021 | Zhou et al. |
| 10,963,652 B2 | 3/2021 | Hashimoto et al. |
| 10,963,782 B2 | 3/2021 | Xiong et al. |
| 10,970,486 B2 | 4/2021 | Machado et al. |
| 11,379,736 B2* | 7/2022 | Trischler ............ G06F 40/279 |
| 2016/0350653 A1 | 12/2016 | Socher et al. |
| 2017/0024645 A1 | 1/2017 | Socher et al. |
| 2017/0032280 A1 | 2/2017 | Socher |
| 2017/0140240 A1 | 5/2017 | Socher et al. |
| 2018/0096219 A1 | 4/2018 | Socher |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0268287 A1 | 9/2018 | Johansen et al. |
| 2018/0268298 A1 | 9/2018 | Johansen et al. |
| 2018/0329883 A1* | 11/2018 | Leidner ............... G06F 40/30 |
| 2018/0336453 A1 | 11/2018 | Merity et al. |
| 2018/0373987 A1 | 12/2018 | Zhang et al. |
| 2019/0034557 A1* | 1/2019 | Alsallakh ............ G06V 10/82 |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0188568 A1 | 6/2019 | Keskar et al. |
| 2019/0197109 A1* | 6/2019 | Peters ................. G06F 40/30 |
| 2019/0213482 A1 | 7/2019 | Socher et al. |
| 2019/0251431 A1 | 8/2019 | Keskar et al. |
| 2019/0258939 A1 | 8/2019 | Min et al. |
| 2019/0286073 A1 | 9/2019 | Asl et al. |
| 2019/0355270 A1 | 11/2019 | McCann et al. |
| 2019/0362246 A1 | 11/2019 | Lin et al. |
| 2020/0005765 A1 | 1/2020 | Zhou et al. |
| 2020/0065651 A1 | 2/2020 | Merity et al. |
| 2020/0090033 A1 | 3/2020 | Ramachandran et al. |
| 2020/0090034 A1 | 3/2020 | Ramachandran et al. |
| 2020/0103911 A1 | 4/2020 | Ma et al. |
| 2020/0104643 A1 | 4/2020 | Hu et al. |
| 2020/0104699 A1 | 4/2020 | Zhou et al. |
| 2020/0105272 A1 | 4/2020 | Wu et al. |
| 2020/0117854 A1 | 4/2020 | Lu et al. |
| 2020/0117861 A1 | 4/2020 | Bradbury |
| 2020/0142917 A1 | 5/2020 | Paulus |
| 2020/0175305 A1 | 6/2020 | Trott et al. |
| 2020/0234113 A1 | 7/2020 | Liu |
| 2020/0272940 A1 | 8/2020 | Sun et al. |
| 2020/0285704 A1 | 9/2020 | Rajani et al. |
| 2020/0285705 A1 | 9/2020 | Zheng et al. |
| 2020/0285706 A1 | 9/2020 | Singh et al. |
| 2020/0285993 A1 | 9/2020 | Liu et al. |
| 2020/0302178 A1 | 9/2020 | Gao et al. |
| 2020/0334334 A1 | 10/2020 | Keskar et al. |
| 2020/0342182 A1* | 10/2020 | Johnson Premkumar ................. G06N 3/044 |
| 2020/0364299 A1 | 11/2020 | Niu et al. |
| 2020/0364542 A1 | 11/2020 | Sun |
| 2020/0364580 A1 | 11/2020 | Shang et al. |
| 2020/0372116 A1 | 11/2020 | Gao et al. |
| 2020/0372319 A1 | 11/2020 | Sun et al. |
| 2020/0372339 A1 | 11/2020 | Che et al. |
| 2020/0372341 A1 | 11/2020 | Asai et al. |
| 2020/0380213 A1 | 12/2020 | McCann et al. |
| 2021/0042604 A1 | 2/2021 | Hashimoto et al. |
| 2021/0049236 A1 | 2/2021 | Nguyen et al. |
| 2021/0073459 A1 | 3/2021 | McCann et al. |
| 2021/0089588 A1 | 3/2021 | Le et al. |
| 2021/0089882 A1 | 3/2021 | Sun et al. |
| 2021/0089883 A1 | 3/2021 | Li et al. |

OTHER PUBLICATIONS

Bowman et al., "A large annotated corpus for learning natural language inference," In Proceedings of the 2015 Conference on Empirical Methods in Natural Language Processing, Sep. 2015, pp. 632-642.

Conneau et al., "Supervised Learning of Universal Sentence Representations from Natural Language Inference Data," CoRR, arXiv:1705.02364v5 [cs.CL], Jul. 8, 2018, 12 pages.

Dagan et al., "The PASCAL recognising textual entailment challenge," In Springer-Verlag Berlin Heidelberg 2006, Machine Learning Challenges Workshop, 2005, pp. 177-190.

Devlin et al., "BERT: Pre-training of Deep Bidirectional Transformers for Language Understanding," In Proceedings of NAACL-HLT 2019, Jun. 2019, pp. 4171-4186.

Gao et al., "FewRel 2.0: Towards More Challenging Few-Shot Relation Classification," In Proceedings of the 2019 Conference on Empirical Methods in Natural Language Processing and the 9th International Joint Conference on Natural Language Processing, Nov. 2019, pp. 6250-6255.

Gao et al., "Hybrid Attention-Based Prototypical Networks for Noisy Few-Shot Relation Classification," In Association for the Advancement of Artificial Intelligence, 2019, pp. 6407-6414.

Hal Daume III, "Frustratingly Easy Domain Adaptation," In Proceedings of the 45th Annual Meeting of the Association of Computational Linguistics, Jun. 2007, pp. 256-263.

Han et al., "FewRel: A Large-Scale Supervised Few-Shot Relation Classification Dataset with State-of-the-Art Evaluation," In Proceedings of the 2018 Conference on Empirical Methods in Natural Language Processing, Oct. 31-Nov. 4, 2018, pp. 4803-4809.

Kang et al., "Transferable Meta Learning Across Domains," In UAI, 2018, pp. 177-187.

Keskar et al., "Unifying Question Answering, Text Classification, and Regression via Span Extraction," CoRR, arXiv:1904.09286v2 [cs.CL], Sep. 20, 2019, 10 pages.

Khot et al., "SciTaiL: A Textual Entailment Dataset from Science Question Answering," In Association for the Advancement of Artificial Intelligence 2018, pp. 5189-5197.

Koch et al., "Siamese Neural Networks for One-shot Image Recognition," In Proceedings of the 32nd International Conference on Machine, JMLR: W&CP vol. 37, 2015, 8 pages.

Kryscinski et al., "Evaluating the Factual Consistency of Abstractive Text Summarization," CoRR, arXiv:1910.12840v1 [cs.CL], Oct. 28, 2019, 11 pages.

Kumar et al., "A Closer Look at Feature Space Data Augmentation for Few-Shot Intent Classification," In Proceedings of the 2nd Workshop on Deep Learning Approaches for Low-Resource NLP (DeepLo 2019), Nov. 3, 2019, pp. 1-10.

Kumar et al., "Ask Me Anything: Dynamic Memory Networks for Natural Language Processing," In Proceedings of the 33rd International Conference on Machine Learning, JMLR: W&CP vol. 48, 2016, pp. 1378-1387.

(56) References Cited

OTHER PUBLICATIONS

Liu et al., "RoBERTa: A Robustly Optimized BERT Pretraining Approach," CoRR, arXiv:1907.11692v1 [cs.CL], Jul. 26, 2019, 13 pages.
Marelli et al., "SemEval—2014 Task 1: Evaluation of Compositional Distributional Semantic Models on Full Sentences through Semantic Relatedness and Textual Entailment," In SemEval@Coling, Aug. 2014, 11 pages.
McCann et al., "The Natural Language Decathlon: Multitask Learning as Question Answering," arXiv:1806.08730v1 [cs.CL], Jun. 20, 2018, 23 pages.
Obamuyide et al., "Zero-shot Relation Classification as Textual Entailment," In Proceedings of the First Workshop on Fact Extraction and VERification (FEVER), Nov. 1, 2018, pp. 72-78.
Phang et al., "Sentence Encoders on STILTs: Supplementary Training on Intermediate Labeled-data Tasks," arXiv:1811.01088v2 [cs.CL], Feb. 27, 2019, 12 pages.
Raffel et al., "Exploring the Limits of Transfer Learning with a Unified Text-to-Text Transformer," arXiv:1910.10683v3 [cs.LG], Jul. 28, 2020, pp. 1-67.
Ren et al., "Meta-Learning for Semi-Supervised Few-Shot Classification," In ICLR, arXiv:?803.00676v? [cs.LG], Mar. 2, 2018, pp. 1-15.
Richardson et al., "MCTest: A Challenge Dataset for the Open-Domain Machine Comprehension of Text," In Proceedings of the 2013 Conference on Empirical Methods in Natural Language Processing, Oct. 18-21, 2013, pp. 193-203.
Rocktaschel et al., "Reasoning about Entailment with Neural Attention," In ICLR, CoRR, arXiv:1509.06664v4 [cs.CL], Mar. 1, 2016, 9 pages.
Santos et al., "Attentive Pooling Networks," CoRR, arXiv:1602.03609v1 [cs.CL], Feb. 11, 2016, 10 pages.
Snell et al., "Prototypical Networks for Few-shot Learning," In NeurIPS, arXiv:1703.05175v2 [cs.LG] Jun. 19, 2017, 11 pages.
Sun et al., "Hierarchical Attention Prototypical Networks for Few-Shot Text Classification," In Proceedings of the 2019 Conference on Empirical Methods in Natural Language Processing and the 9th International Joint Conference on Natural Language Processing (EMNLP-IJCNLP), Nov. 3-7, 2019, pp. 476-485.
Sung et al., "Learning to Compare: Relation Network for Few-Shot Learning," In CVPPR, CoRR, arXiv:1711.06025v2 [cs.CV], Mar. 27, 2018, pp. 1199-1208.
Timothy Miller, "Simplified Neural Unsupervised Domain Adaptation," In Proceedings of NAACL-HLT 2-019, Jun. 2-7, 2019, pp. 414-419.
Vinyals et al., "Matching Networks for One Shot Learning," In NeurIPS, CoRR, arXiv:1606.04080v1 [cs.LG], Jun. 13, 2016, 12 pages.
Wang et al., "Bilateral Multi-Perspective Matching for Natural Language Sentences," In Proceedings of the Twenty-Sixth International Joint Conference on Artificial Intelligence (IJCAI-17), 2017, pp. 4144-4150.
Wang et al., "Glue: A Multi-Task Benchmark and Analysis Platform for Natural Language Understanding," In ICLR, CoRR, arXiv:1804.07461v3 [cs.CL], Feb. 22, 2019, 20 pages.
Wang, et al., "Learning natural language inference with LSTM," NAACL HLT 2016: Proceedings of the 2016 Conference of the North American Chapter of the Association for Computational Linguistics: Human Language Technologies, Jun. 12-17, 2016, pp. 1442-1451.
Webster et al., "Mind the GAP: A balanced corpus of gendered ambiguous pronouns," Transactions of the Association for Computational Linguistics, vol. 6, 2018, pp. 605-617.
Williams et al., "A Broad-Coverage Challenge Corpus for Sentence Understanding through Inference," In Proceedings of NAACL-HLT 2018, Jun. 1-6, 2018, pp. 1112-1122.
Yin et al., "ABCNN: Attention-Based Convolutional Neural Network for Modeling Sentence Pairs," Transactions of the Association for Computational Linguistics, vol. 4, 2016, pp. 259-272.
Yin et al., "Attentive Convolution: Equipping CNNs with RNN-style Attention Mechanisms," Transactions of the Association for Computational Linguistics, vol. 6, 2018, pp. 687-702.
Yin et al., "Benchmarking Zero-shot Text Classification: Datasets, Evaluation and Entailment Approach," In Proceedings of the 2019 Conference on Empirical Methods in Natural Language Processing and the 9th International Joint Conference on Natural Language Processing (EMNLP-IJCNLP), Nov. 3-7, 2019, pp. 3914-3923.
Yin et al., "End-Task Oriented Textual Entailment via Deep Explorations of Inter-Sentence Interactions," In ACL, arXiv:1804.08813v3 [cs.CL], May 15, 2018, pp. 540-545.
Yu et al., "Diverse Few-Shot Text Classification with Multiple Metrics," In Proceedings of NAACL-HLT 2018, Jun. 1-6, 2018, pp. 1206-1215.
Zhang et al., "Optimizing the Factual Correctness of a Summary:A Study of Summarizing Radiology Reports," CoRR, arXiv:1911.02541v2 [cs.CL], Nov. 8, 2019, 13 pages.

* cited by examiner

500

502 Input: MNLI as $D_S$, $k \times |C|$ examples from $T$
504 denoted as $D_T$
506 Output: A 3-way entailment classifier
508 Sample $k$ example from $S$'s class "e", "n" and "c" as
510 $D_S^e$, $D_S^n$ and $D_S^c$, respectively; remaining examples
512 in $D_S$ form minibatches $B_S = \{B_S^i\}$.
514 while each mini-batch $B_S^i$ do
516     build a mini-batch $\hat{B}_T^i = \{\hat{D}_T^e, \hat{D}_T^n, \hat{D}_T^c\}$ from
518     $D_T$, $|\hat{D}_T^i| = m$ and $m < k$.
520     build class representation:
522     $p_w^j = \sum \text{RoBERTa}(D_w^j)$, $w \in \{S, T\}$ and
524     $j \in \{e, n, c\}$
526     build a query batch $B^i = \{B_S^i, B_T^i\}$
528     while each query $q$ in $B_S^i$ do
530         compare $q$ with class representations $\{p_w^j\}$
532         to get probability distribution $g$
534         get loss for $q$
536     end
538     loss $l_S$ is the mean loss in $B_S^i$
540     while each query $q$ in $B_T^i$ do
542         compare $q$ with class representations $\{p_w^j\}$
544         to get probability distribution $g$
546         get loss for $q$
548     end
550     loss $l_T$ is the mean loss in $B_T^i$
552     loss $l = l_S + l_T$ for this query batch $B^i$
554     update the RoBERTa and nearest neighbor block
556 end

*FIG. 5*

(12) United States Patent

SYSTEM AND METHOD FOR NATURAL LANGUAGE PROCESSING USING NEURAL NETWORK WITH CROSS-TASK TRAINING

RELATED APPLICATIONS

This application claims priority to U.S. Provisional Patent Application No. 62/945,789 filed Dec. 9, 2019, which is incorporated by reference herein in its entirety.

TECHNICAL FIELD

The present disclosure relates generally to machine learning models and neural networks, and more specifically, to use machine learning models (e.g., few-shot trained textual entailment model) and neural networks to perform natural language processing (NLP).

BACKGROUND

Artificial intelligence, implemented with neural networks and deep learning models, has demonstrated great promise as a technique for automatically analyzing real-world information with human-like accuracy. In general, such neural network and deep learning models receive input information and make predictions based on the same. Whereas other approaches to analyzing real-world information may involve hard-coded processes, statistical analysis, and/or the like, neural networks learn to make predictions gradually, by a process of trial and error, using a machine learning process.

Natural language processing (NLP) is one class of problems to which neural networks may be applied. NLP tasks include natural language inference, sentiment classification, and semantic textual similarity. Typically, one way to address different NLP problems is to first construct a problem-specific dataset for a specific NLP problem, then building a model to fit this dataset.

As such, there is a need for providing an improved way to address different NLP problems with a more unified approach.

BRIEF DESCRIPTION OF THE DRAWINGS

FIG. 5 is an example pseudo-code for algorithms to implement the method of FIG. 4 according to some embodiments.

In the figures, elements having the same designations have the same or similar functions.

DETAILED DESCRIPTION

Artificial intelligence, implemented with neural networks and deep learning models, has demonstrated great promise as a technique for automatically analyzing real-world information with human-like accuracy. In general, such neural network and deep learning models receive input information and make predictions based on the input information.

Natural language processing (NLP) is one class of problems to which neural networks may be applied. NLP tasks include natural language inference, sentiment classification, and semantic textual similarity. Textual entailment aims to figure out whether a new claim ("hypothesis") is true given a background textual description ("premise"). But textual entailment is rarely applied in real NLP tasks.

With previously developed techniques, most NLP problems are studied and modeled separately, and the progress is constrained by the size of annotated data. In this disclosure, it is demonstrated that some typical NLP tasks share a common pattern—essentially a textual entailment problem. As such, textual entailment may be applicable to handle those NLP tasks even if only a limited number of examples are available.

According to some embodiments, the present disclosure provides systems and methods that implement a few-shot textual entailment paradigm which enables a pretrained entailment model to work well on any new entailment dataset once a small number of examples are provided (few-shot learning). In some embodiments, a few-shot entailment algorithm acts as a unified solver to deal with various NLP tasks such as question answering, coreference resolution, relation extraction, etc.

Figure 1:
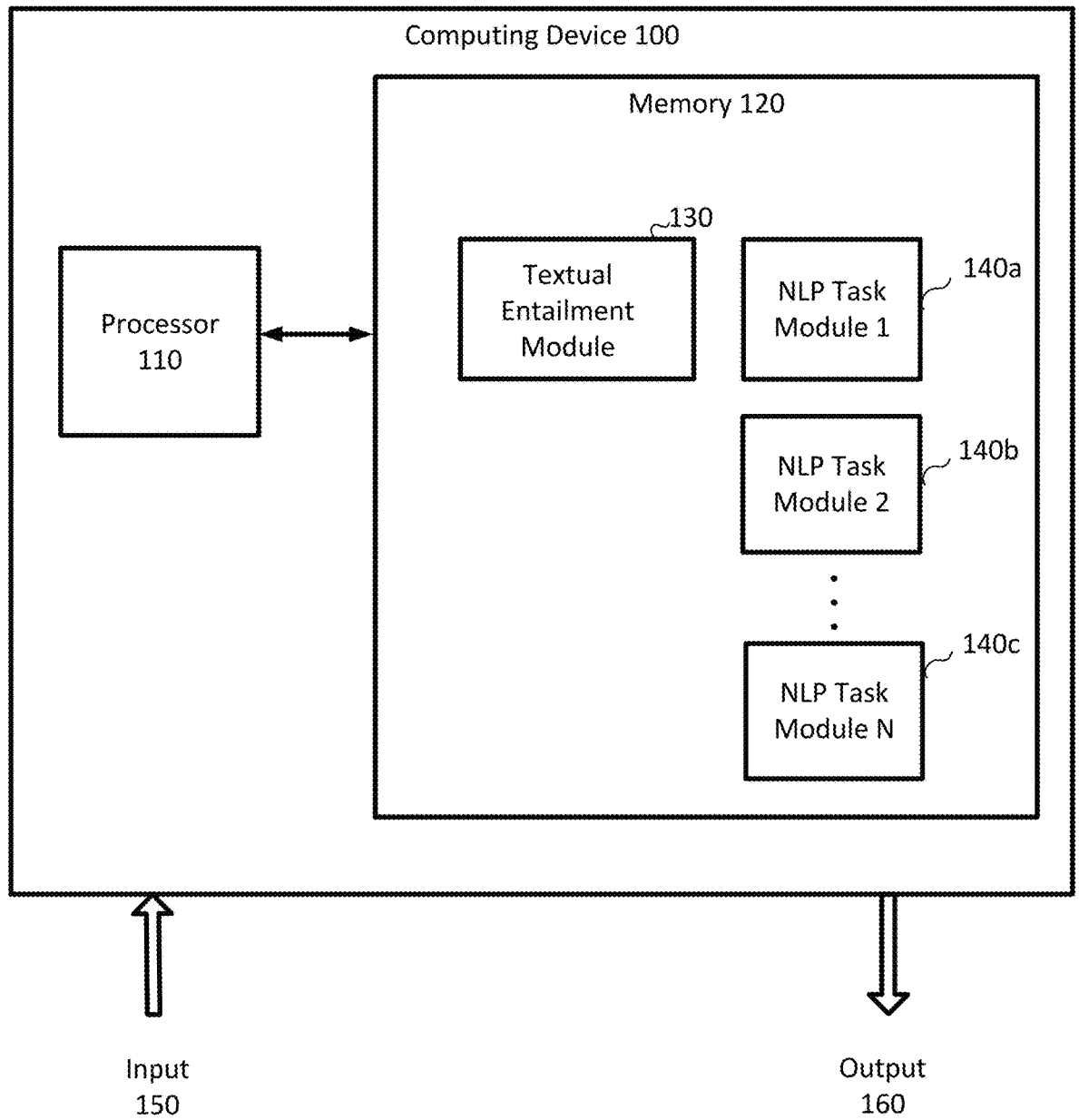
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a textual entailment module 130 and a plurality of natural language processing (NLP) task modules 140a, 140b, 140c that may be used, either separately or together, to implement and/or emulate the neural network systems and models described further herein and/or to implement any of the methods described further herein. In some examples, memory 120 may include non-transitory, tangible, machine readable media that includes executable code that when run by one or more processors (e.g., processor 110) may cause the one or more processors to perform the methods described in further detail herein. In some examples, the textual entailment module 130 and NLP task modules 140a-c may be implemented using hardware, software, and/or a combination of hardware and software. As shown, computing device 100 receives input 150, which is provided to textual entailment module 130 and NLP task modules 140a-c, which then generates output 160.

According to some embodiments, computing device 100 implements an architecture or framework whereby textual entailment module 130 is developed or trained as a textual entailment predictor, and then applied to one or more downstream NLP tasks. That is, in some embodiments, given two textual sequences (e.g., a background textual description or "premise" P, and a new textual claim or "hypothesis" H), textual entailment module 130 studies their relationship and predicts whether the hypothesis is true given the premise (whether H is true given P). After training, textual entailment module 130 can be applied to a variety of downstream NLP tasks such as, for example, question answering, coreference resolution, and relation classification. Each of NLP task modules 140a-c performs a different NLP task. In some embodiments, for each downstream NLP task, k examples are provided to the textual entailment system.

Input 150 for computing device 100 may include training data for textual entailment module 130 and data related to the NLP tasks to be performed by NLP task modules 140a-c. Output 160 may include the results from NLP task modules 140a-c.

In some embodiments, a large scale textual entailment dataset (e.g., Multi-Genre Natural Language Inference (MNLI) dataset) may be used for generic training of the textual entailment model, and a small number of examples (e.g., k examples) from a respective target domain are provided for specific training for each NLP task. The large scale textual entailment dataset includes a large number of annotated examples (e.g., MNLI dataset includes about 433 k sentence pairs annotated with textual entailment information, Stanford Natural Language Inference (SNLI) dataset includes about 570 k annotated sentence pairs), while the number of examples from the target domain may be very small (e.g., 2, 3, . . . , an integer less than 10). This allows building or developing an entailment predictor which can work well in the target domain or task although only limited examples are provided. It is noted that in the description below, MNLI is used as an example of the large scale textual entailment dataset, however, any other suitable large scale textual entailment dataset may be used.

Thus, in some embodiments, the input 150 includes the MNLI dataset and the support set (i.e., k examples for each type {entailment, non-entailment}). The output 160 is a binary entailment classifier, predicting "entailment" or "nonentailment" for each example in the new domain.

Figure 2:
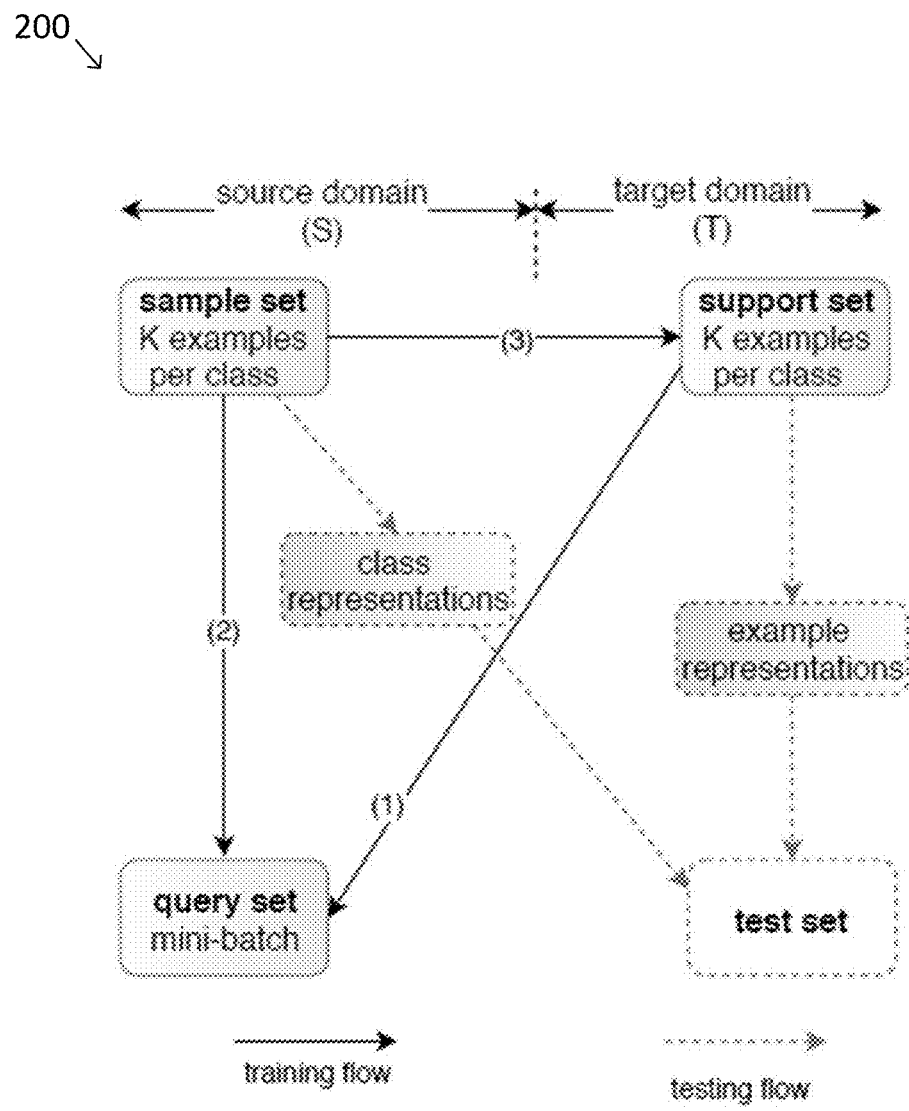
FIG. 2 is a simplified diagram of a framework for training a textual entailment model according to some embodiments.

FIG. 2 is a simplified diagram of a framework 200 for training a neural network model according to some embodiments. As seen in FIG. 2, in some embodiments, the training may include three phases, all striving to mapping the support set from the new domain and the examples in MNLI into the same space, so that a predictor well trained on MNLI (i.e., textual entailment module 130 in conjunction with one or more of the NLP task modules 140a-c) can also work in the target domain. Hereafter, MNLI is referred to as S (source domain), and the new domain or task as T (target domain).

In some embodiments, to imitate the testing scenario—each class has only k examples—the same situation is created in the S domain. That is, the model is built on k randomly sampled examples ("sample set") of each class in S, and then predicts all the remaining instances ("query set"). The purpose here is to ensure that the selected sample set can represent the greater number of examples in the whole dataset; if the sample set in S can represent the whole S, then the support set from T can better represent the whole test set in T.

In some embodiments, given the support set, sample set and query set, each of the following phases in training involves two of them. One of them acts as seeds ("seed set") to provide label information while the other seeks labels ("seek set") by comparing with seeds.

Referring to FIG. 2, phase (1) of training uses the support set from T, to predict the labels of each minibatch of query set in S. Phase (2) of training uses the sample set from S as seeds, to predict the labels of each minibatch of query set in S (excluding the k examples). Phase (3) of training uses the sample set from S, to predict the labels of the support set in T. The three phases of training provide or support building a common space between the source and target domain, and make the support set more representative in the target domain. Finally, the test set in the target domain gets prediction by knowledge from the target support set as well as the source domain.

Figure 3:
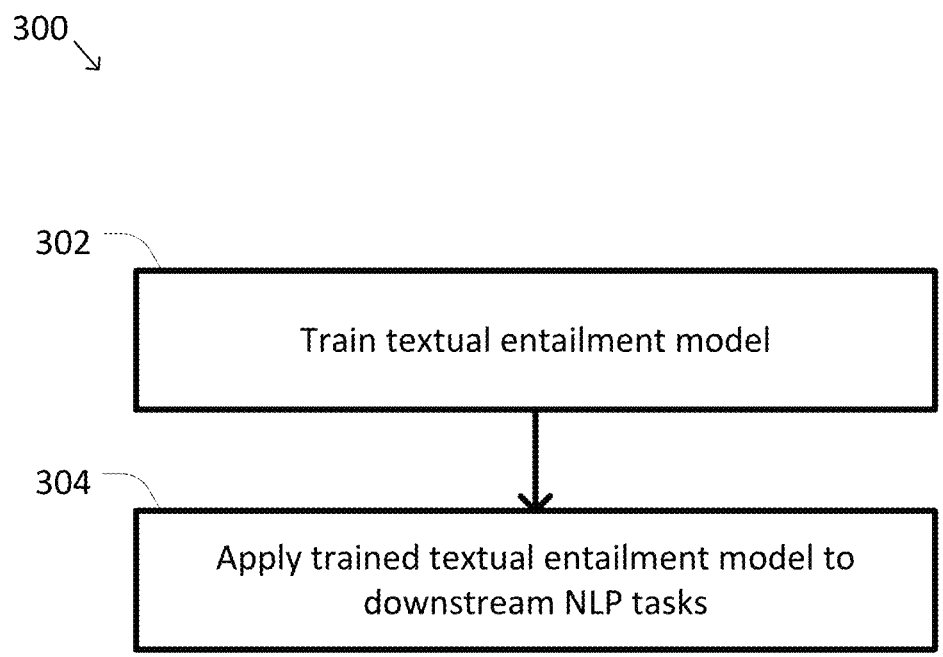
FIG. 3 is a simplified diagram of a method for using textual entailment model according to some embodiments.

FIG. 3 is a simplified diagram of a method 300 corresponding to the framework 200 according to some embodiments. One or more of the processes 302-304 of method 300 may be implemented, at least in part, in the form of executable code stored on non-transitory, tangible, machine-readable media that when run by one or more processors may cause the one or more processors to perform one or more of the processes 302-304.

At a process 302, the textual entailment model (which in some examples may be implemented at least in part by textual entailment module 130) is trained. In some embodiments, this training includes training with a large textual entailment dataset (e.g., MNLI) for generic textual entailment. The training may also include few-shot training with a small number of examples (e.g., k) for other NLP domains for specific training on those tasks.

At a process 304, the trained textual entailment model is applied to downstream NLP tasks. In some embodiments, this is accomplished by the textual entailment module 130 working in conjunction with NLP task modules 140a-c.

Figure 4:
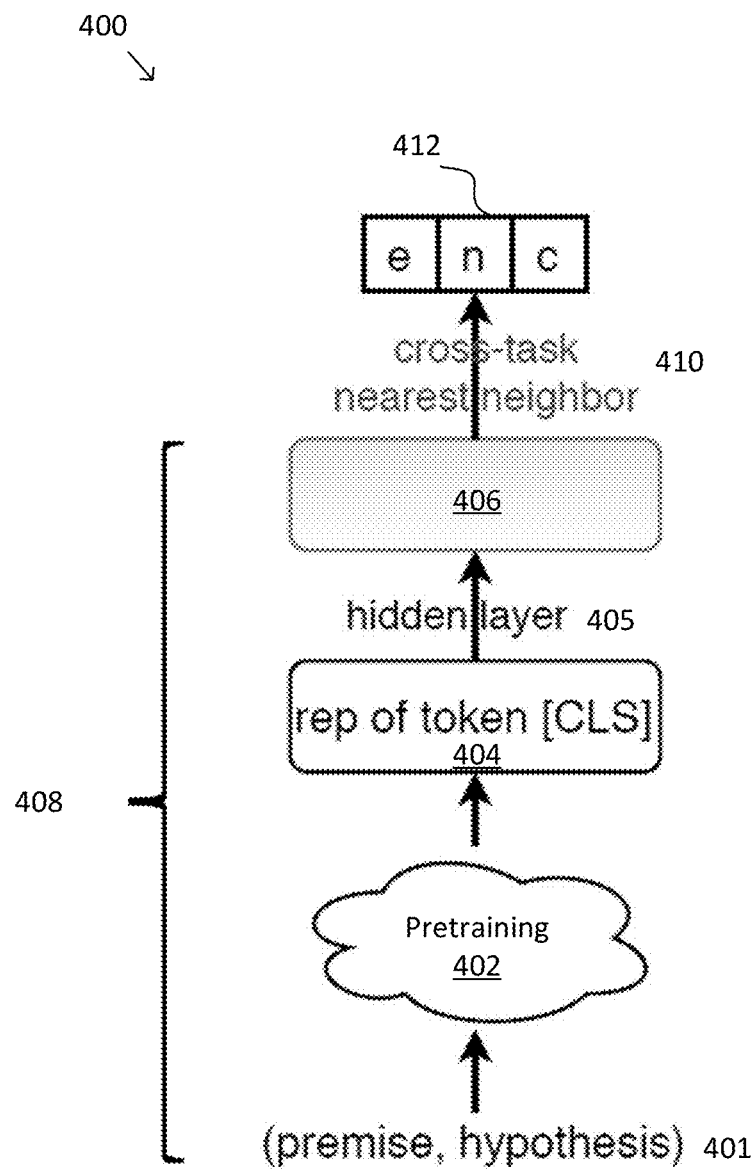
FIG. 4 is a simplified diagram of a neural network model for natural language processing according to some embodiment.
Figure 6:
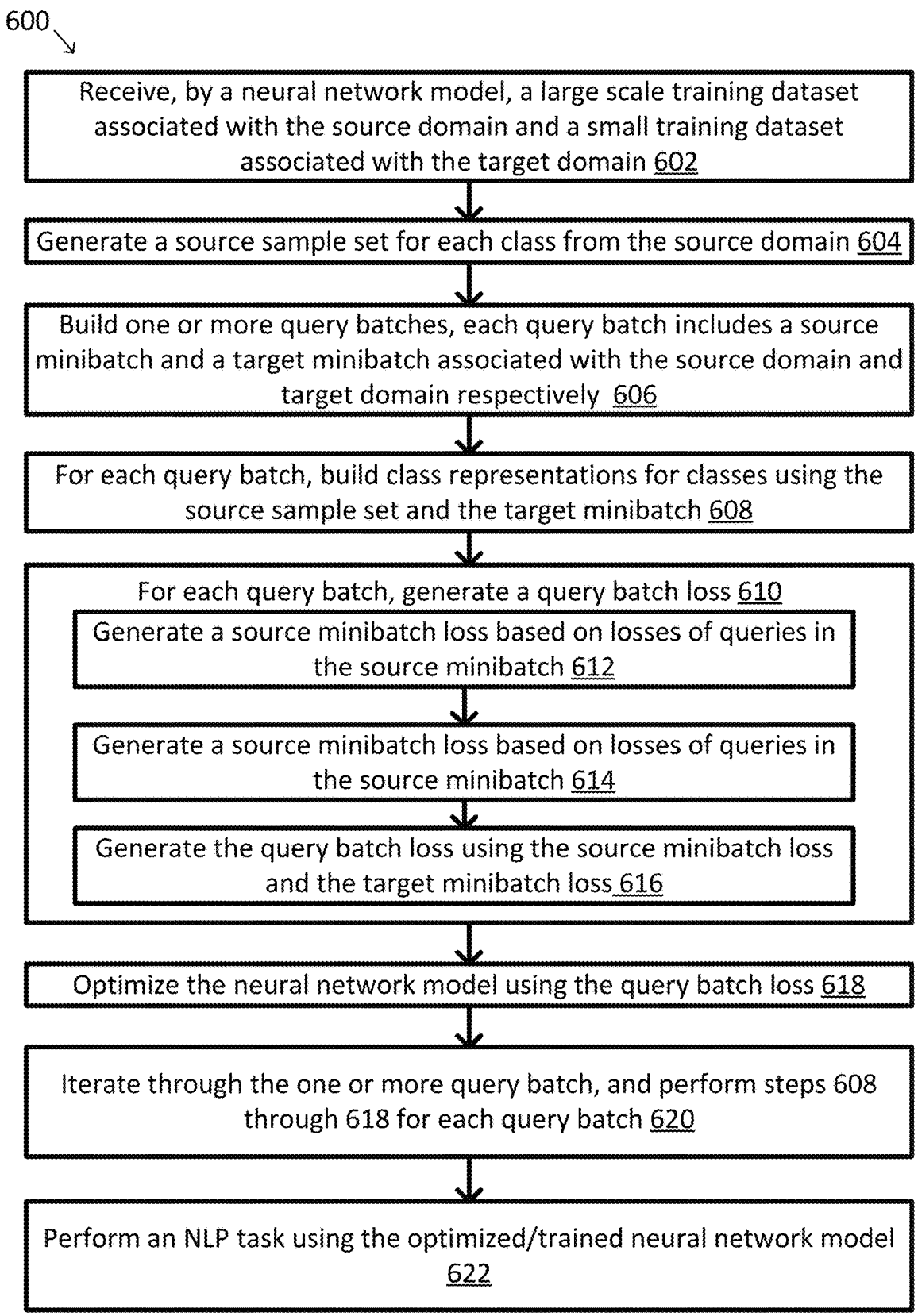
FIG. 6 is a simplified diagram of a method for training and using a neural network for natural language processing according to some embodiments.
Figure 7:
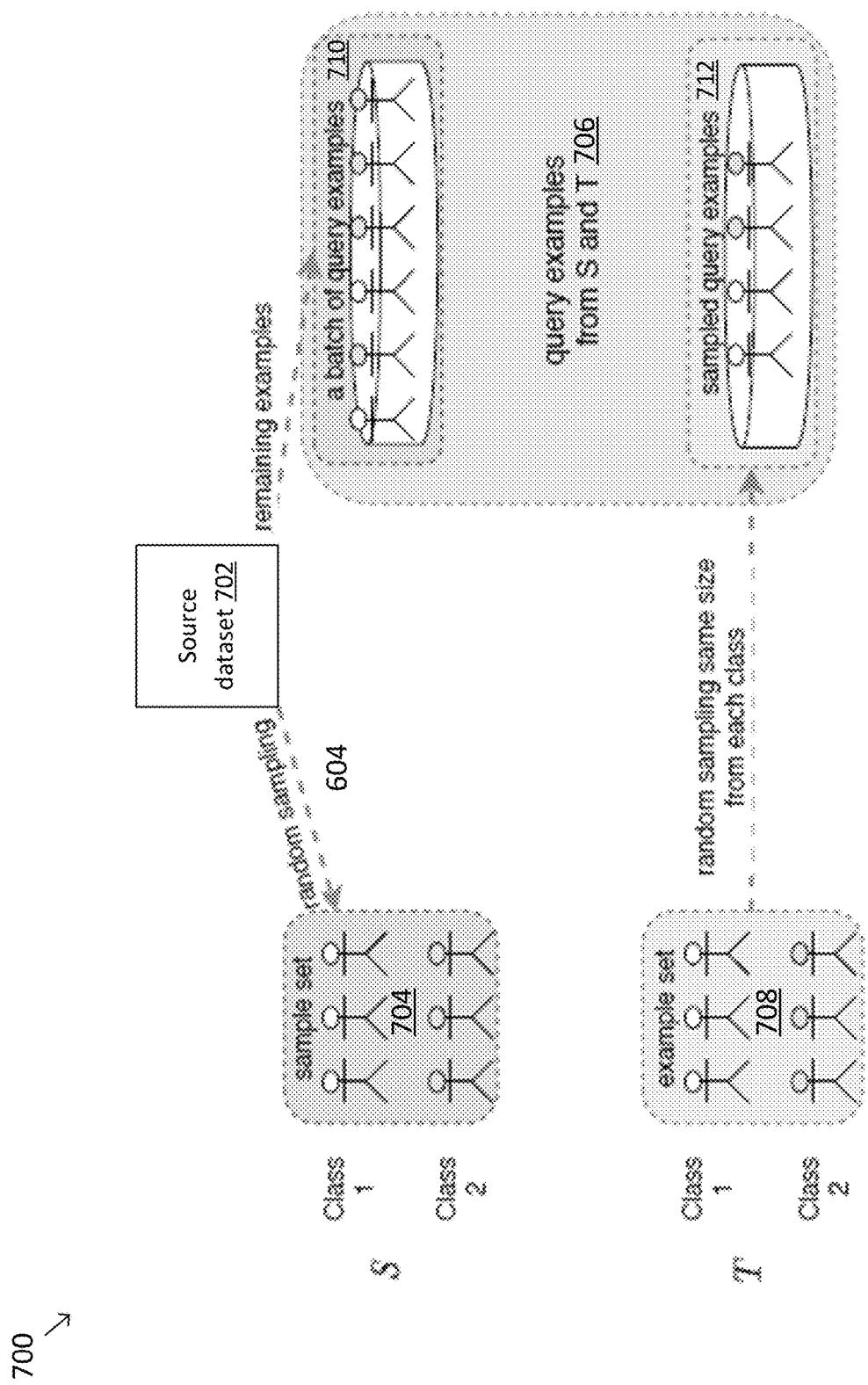
FIG. 7 is a simplified diagram of a method of generating source sample sets and query batches according to some embodiments.
Figure 8:
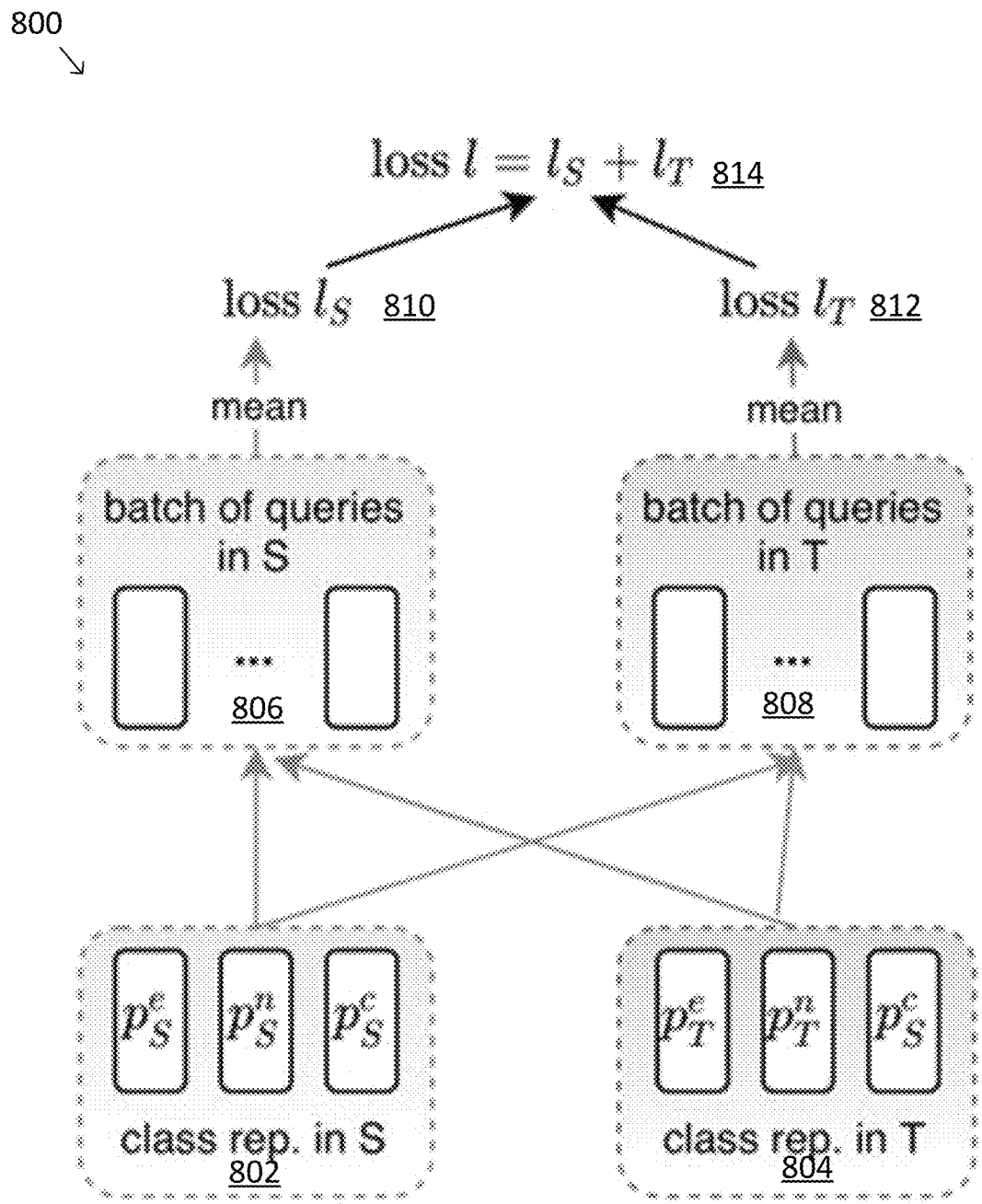
FIG. 8 is a simplified diagram of a method of generating a query batch loss according to some embodiments.

Referring to FIGS. 4-8, systems and methods for training and using a neural network model for natural language processing are described. Specifically, the neural network model includes a Universal Few-shot textual Entailment (UFO-ENTAIL) model. FIG. 4 is a simplified diagram of a neural network model including UFO-ENTAIL. FIG. 5 is an example pseudo-code for algorithms from training and using UFO-ENTAIL. FIG. 6 describes a method for training and using UFO-ENTAIL for natural language processing. FIG. 7 is a simplified diagram of a method of generating source sample sets and query batches for training UFO-ENTAIL. FIG. 8 is a simplified diagram of a method of generating a query batch loss for training UFO-ENTAIL.

As described in detail below, UFO-ENTAIL is used to achieve Universal NLP (using a single machine to address diverse NLP problems). Specifically, UFO-ENTAIL enables a pretrained entailment model to work well on new entailment domains in a few-shot setting, and is effective as a unified solver for several downstream NLP tasks (e.g., question answering, coreference resolution, etc.) when the end-task annotations are limited. Note that Universal NLP is different from using the same machine learning algorithm such as convolution nets to solve tasks, because the latter still results in task-specific models which cannot solve other tasks.

Textual entailment (also known as a type of natural language inference) includes the task of studying the relation of two assertive sentences, Premise (P) and Hypothesis (H): whether H is true given P. With the advances of deep neural networks and the availability of large scale human annotated datasets, fine-tuned systems for textual entailment claimed surpassing human performance on certain benchmarks. Nevertheless, there are challenges with the typical textual entailment systems. For example, the increasing performances on some benchmarks heavily rely on rich human annotations, and a typically trained entailment system cannot work on benchmarks in other domains. Those textual entailment systems are far from being deployed in new domains where no rich annotation exists. For further example, lots of NLP tasks may be studied in the entailment framework, but it was unclear when it is worth transforming a target NLP tasks to textual entailment. UFO-ENTAIL addresses these challenges, with the finding that textual entailment particularly matters when the target NLP task has insufficient annotations, where some NLP tasks that a task-specific model cannot handle (e.g., where annotations are insufficient to build a task-specific model) can be handled by UFO-ENTAIL (e.g., based on shared inference pattern).

In some embodiments, a large scale textual entailment dataset (e.g., Multi-Genre Natural Language Inference (MNLI) dataset or any other suitable dataset) may be used for generic training of the textual entailment model, and a small number of examples (e.g., k examples) from respective target domains are provided for specific training for each NLP task. This allows building or developing an entailment predictor which can work well in the target domain or task although only limited examples are provided. It is noted that in the description below, MNLI is used as an example of the large scale textual entailment dataset, however, any other suitable large scale textual entailment dataset may be used.

UFO-ENTAIL addresses cases where training tasks (e.g., in source domain) and test tasks/real tasks (e.g., in target domain/a new domain different from the source and target domains) during interference are not in the same distribution. UFO-ENTAIL builds class representation also using the representations of some class-specific labeled examples from the target domain, in addition to using examples from the source domain. UFO-ENTAIL differs from other neural network models (e.g., within-a-task nearest neighbor models) in that it is based on cross-task nearest neighbor by keeping class representations for both S and T in training as well as in testing/interference process. Further, in UFO-ENTAIL, query examples in training also comes from S and T. In some embodiments, because of the mismatch of the distributions in S and T, UFO-ENTAIL not only learns the matching function, but also maps the instances in S and T to the same space. This is different from other neural network models that build a nearest neighbor algorithm within a task where in training, class representations are built in training tasks and query examples come from the training tasks only; in testing, the query examples from the testing tasks only compare with the few labeled examples specific to the testing task, and the training tasks do not participate anymore.

Referring to FIG. 4, in an example, UFO-ENTAIL 400 includes an encoder 408 (e.g., including pretraining model 402 (e.g., A Robustly Optimized BERT Pretraining Approach (RoBERTa) and one or more hidden layers 405) and a cross-task/cross-domain nearest neighbor block 410.

In some embodiments, UFO-ENTAIL 400 uses a large scale generic purpose textual entailment dataset (e.g., MNLI), which is used to build a base entailment system, e.g., encoder 408, with acceptable performance Specifically, in some embodiments, the pretraining model 402 (e.g., RoBERTa) that is pretrained on a source domain (e.g., MNLI) provides class representations 404 in a representation space biased to the source domain. For example, for textual entailment, RoBERTa takes an input pair 401 including two sentences (premise, hypothesis), and outputs a representation vector (e.g., the one corresponding to the token "CLS") 404 to denote the input pair, then maps this representation into a new space 406 by a hidden layer 405, finally conducts classification on that space through logistic regression. Overall, RoBERTa 402 works with the hidden layer 405 together as an encoder 408. Such an "RoBERTa+ HiddenLayer" encoder may also be referred to as "RoBERTa" below. The pretraining model 402 (e.g., RoBERTa) is prepared by pretraining it on the source data S. This pretrained entailment encoder 408 acts as a base system to deal with any new tasks (with the help of k examples from the new domain).

As shown in FIG. 4, UFO-ENTAIL 400 includes the cross-task/cross-domain nearest neighbor block 410 to achieve better performance in any new domain or new task, by using both the generic purpose textual entailment dataset and a small number of examples associated with the new domain/task, and generates a better-performing entailment for that new domain/task. In various real-world applications, a new domain or new task may not typically have large annotated data, but obtaining a small number of examples is usually feasible.

In some embodiments, the cross-task nearest neighbor block 410 performs a cross-task nearest neighbor process and mitigates the distribution difference between the source domain and the target task (given only a small number of examples, e.g., less than 10 examples). The cross-task nearest neighbor process includes for example, building representations for each class in the S and T, using batches of query instances from S as well as T and comparing with those class representations by a matching function to compute a loss, and training UFO-ENTAIL 400, including its components based on the loss. It is referred to as a "cross-task" nearest neighbor process because both the classes and the query examples cover tasks from both S and T, and such a cross-task nearest neighbor process helps to deal with new NLP problems of scarce annotations from textual entailment.

UFO-ENTAIL systematically implements textual entailment in open domains, given only a small number of domain-specific examples. Further, UFO-ENTAIL develops a unified NLP framework based on textual entailment, where its few-shot textual entailment may be used to achieve universal NLP when there is no guarantee the accessibility of rich annotations. In an example, UFO-ENTAIL is trained on MNLI and k examples from the target domain/task to two out-of-domain entailment benchmarks and two NLP tasks (question answering and coreference resolution), and is effective in addressing the challenges in a typical task-specific textual entailment model as described above.

Referring to the example of FIG. 5, illustrated therein is an example pseudo code for an algorithm 500 training UFO-ENTAIL (e.g., UFO-ENTAIL 400 of FIG. 4). As shown at lines 502-504, the algorithm 500 begins receiving, by a neural network model, inputs including a large scale textual entailment dataset (e.g., MNLI dataset including over 400K pairs of sentences) in a source domain, a target dataset with data in a target domain (e.g., k examples for each type {entailment, non-entailment} in the target domain). In some embodiments, k may be a small integer, e.g., an integer less than 10, including e.g., 1, 2, 3, etc. In other embodiments, k may be an integer greater than 10. The neural network model may include a pretraining model (e.g., RoBERTa) for generating class representations, and a nearest neighbor block generating the loss based on the class representations. As shown at line 506, the algorithm 500 generates outputs including an entailment classifier. In an example, the entailment classifier is a three-way entailment classifier providing a prediction from three classes including "e" (entailment), "n" (neutral), and "c" (contradiction). In another example, the entailment classifier is a two-way entailment classifier providing a prediction from two classes including "e" (entailment), "ne" (non-entailment).

As shown at lines 502-504, the problem may be formulated as building an entailment predictor that can work well in the target domain/task even if only a small number of examples are available for the target domain/task, by using a large scale generic textual entailment dataset and a small number few examples from a target domain or a target task. In an example, the inputs include: MNLI as the source domain (also referred to as S), the example set (i.e., k examples for each type in {"entailment", "non-entailment"} or {"entailment", "neutral", "contradiction"} if applicable) from the target domain (also referred to as T). The output is an entailment classifier, predicting a label for each instance in the new domain/task.

In some embodiments, examples from the target domain need to be converted into labeled entailment instances if the target task is not a standard entailment problem. In those embodiments, the entailment-style outputs may be converted to the prediction format required by the target tasks.

At lines 508-510, a source sample set is generated for each class (e.g., "e" "n" and "c") from the source domain, by sampling k examples for each class from the source domain. The source sample sets are denoted as $D_S^e$, $D_S^n$, $D_S^c$ respectively.

At lines 510-512, source minibatches (also referred to as sub-batches) are generated using examples from the source domain. In an example, the source minibatches are generated using the remaining examples of the source domain after generating the source sample sets.

At lines 514-518, target minibatches are generated using examples from the target domain. In an example, the size m of each target minibatch is less than k.

At lines 520-524, class representations are generated for each class using the source sample sets and the target minibatches. Various pretrained models (e.g., pretrained BERT, pretrained RoBERTa, any other suitable pretraining models, and/or a combination) that have been pretrained using the large scale source data S may be used to generate the class representations.

As an example, let $p_w^e$, $p_w^n$, and $p_w^c$ denote the class representations for the three classes {"entailment", "neutral", "contradict"} in w, w∈{S, T}. In an example where the target task T can only be converted into two classes, i.e., "entail" vs. "non-entail", let $p_T^n = p_T^c$, both denoting the class "non-entail."

Assume that for the target T, each class has k labeled examples (example set). For the source domain S, randomly sample k examples ("sample set") of each class in S. Then, $$p_w^j = \frac{1}{k} \sum_{i=1}^{k} RoBERTa(x_n^i) \quad (1)$$

where $\{x_n^i\}$, i=1 . . . k, are the labeled k examples for class j∈e, n, c in T or S, RoBERTa(•)∈$\mathbb{R}^d$ and $p_w^j \in \mathbb{R}^d$. In a particular example where there are three classes from the source domain and three classes from the target domain, UFO-ENTAIL keeps class representations for a total of six classes, three classes from the source domain and three classes from the target domain.

At line 526, a query batch is generated by combining a source minibatch and a target minibatch. In various embodiments, a query batch is composed of two sub-batches (mini-batches), one from S, the other from T. For S, apart from the source sample set, the remaining labeled examples are grouped as mini-batches. For T, since all the labeled examples it has are those k supporting examples per class, randomly sample m examples from the k supporting examples for each class (m<k), and finally incorporate them into a S's mini-batch as a bigger batch of queries.

By using query batches each including a source minibatch and a target minibatch, UFO-ENTAIL is capable of handling new tasks given a textual entailment task. UFO-ENTAIL uses the source entailment task to obtain valuable knowledge to warm up the model learning. For a testing/interference instance in T, UFO-ENTAIL provides reasoning conclusions derived from both S and the example set in T. In some examples, for training, classes in S and T are treated equally, and the queries in S and T are treated equally as well, which leads to a higher-level abstract task in which S and T learn from each other to mitigate the difference.

At lines 528-536, for each query in the source minibatch of the query batch, a probability distribution is generated, and a loss associated with the query is generated based on that probability distribution. Specifically, at lines 530-532, for each query in the source minibatch of the query batch, a probability distribution is generated by comparing the query with class representations for each class.

In some embodiments, the probability distribution is generated using match functions. For example, a query example gets its representation q through the encoder (e.g., RoBERTa), then a matching score $s_{p,q}$, between this query example and one class (class representation p), is learnt as follows:

$$I = [p, q, p \circ q, p - q] \quad (2)$$

$$r_1 = dropout(tanh(W_1 \times I)) + I \quad (3)$$

$$r_1 = dropout(tanh(W_2 \times r_1)) + r_1 \quad (4)$$

$$r_3 = dropout(tanh(W_3 \times r_2)) \quad (5)$$

$$r_4 = dropout(tanh(W_4 \times r_3)) \quad (6)$$

$$s_{p,q} = sigmoid(W_5 \times r_4) \quad (7)$$

where I∈$\mathbb{R}^{4d}$, $W_1$, and $W_2 \in \mathbb{R}^{4d \times 4d}$, $W_3 \in \mathbb{R}^{4d \times 2d}$, $W_4 \in \mathbb{R}^{2d \times d}$ and $W_5 \in \mathbb{R}^d$.

A probability distribution may be generated per query using the match functions. A query example will obtain matching scores from $S(g_S \in \mathbb{R}^3)$ for the corresponding classes respectively, and matching scores from $T(g_T \in \mathbb{R}^3)$ for the corresponding classes respectively. A final probability distribution is generated using those matching scores from the source domain and the target domain. In an example, linear combination with artificial weights is used to generate the final probability distribution. Yet another example, to obtain a final probability distribution of multiple (e.g., three dimensions corresponding to three classes) dimensions, the system learns automatically the contribution of $g_S$ and $g_T$ in a new space. As such, the final probability distribution $g \in \mathbb{R}^3$ is learned as follows:

$$\hat{g}_S = \mathrm{sigmoid}(W_6 \times g_S) \quad (8)$$

$$\hat{g}_T = \mathrm{sigmoid}(W_6 \times g_T) \quad (9)$$

$$\lambda = \mathrm{sigmoid}(W_7 \times [g_S, g_T]) \quad (10)$$

$$g = \mathrm{softmax}(\lambda \circ \hat{g}_S + (1-\lambda) \circ \hat{g}_T) \quad (11)$$

where $W_6 \in \mathbb{R}^3$ and $W_7 \in \mathbb{R}^6$. g is used to compute loss to train the system in training and predict the class in testing/inference processes.

At line 534, for each query, a loss is generated based on the probability distribution associated with the query.

At line 538, a source minibatch loss is generated based on the losses of the queries in the source minibatch of the query batch. In an example, the source minibatch loss is generated using the mean of all the losses of the queries in the source minibatch of the query batch.

At lines 540-548, for each query in the target minibatch of the query batch, a probability distribution is generated (e.g., using matching functions), and a loss associated with the query is generated based on that probability distribution. Specifically, at lines 542-544, for each query in the target minibatch, a probability distribution is generated by comparing the query with class representations for each class. At line 546, for each query, a loss is generated based on the probability distribution associated with the query.

At line 550, a target minibatch loss is generated based on the losses of the queries in the target minibatch of the query batch. In an example, the target minibatch loss is generated using the mean of all the losses of the queries in the target minibatch of the query batch.

At line 552, a query batch loss is generated based on the source minibatch loss and the target minibatch loss. In an example, the query batch loss (the overall loss for that batch) is the sum of the source minibatch loss and the target minibatch loss, computed as $l = l_S + l_T$. In another example, the query batch loss is a weighted sum of the source minibatch loss and the target minibatch loss.

At line 554, the neural network model is optimized based on the query batch loss. In an example, parameters of the pretraining model (e.g., RoBERTa) and the a nearest neighbor block of the neural network model are updated based on the query batch loss (e.g., to minimize the query batch loss).

Algorithm 500 may iterate through the query batches for the optimization of the neural network, as shown in lines 514-556. The optimized/trained neural network model may be used to perform a NPL task. The NPL task may be associated with the target domain or a new domain that is different from the source domain and the target domain.

Referring to the example of FIG. 6, the method 600 (e.g., performed by processor 110 of FIG. 1) for training (e.g., using algorithm 500 of FIG. 5) and using UFO-ENTAIL (e.g., UFO-ENTAIL 400 of FIG. 4) is illustrated. The method 600 may begin at block 602, where a neural network model including UFO-ENTAIL receives a large scale training dataset associated with the source domain and a small training dataset associated with the target domain.

The method 600 may proceed to block 604, where a source sample set for each class is generated by sampling from the source domain. Referring to FIG. 7, illustrated is an example diagram illustrating the generation of a source sample set from the source domain and query batches from the source domain and target domain. Note that while FIG. 7 illustrates only two classes (e.g., class 1, class 2) are illustrated for each of the source domain and target domain, any other suitable number of classes may be used. At block 604, a random sampling may be performed to the source dataset 702 (e.g., MNLI) to generate a source sample set 704 for each class.

The method 600 may proceed to block 606, where one or more query batches are generated. Each query batch may include a source minibatch and a target minibatch associated with the source domain and target domain respectively. As shown in the example of FIG. 7, a query batch 706 may include a source minibatch 710 (e.g., obtained using remaining examples from the source dataset 702), and a target minibatch 712 (e.g., by randomly sampling from the target examples).

The method 600 may proceed to block 608, where for each query batch, class representations for all classes in the source domain and target domain are generated using the source sample set and the target minibatch. Referring to FIG. 8, class representations 802 for each class in the source domain and class representations 804 for each class in the target domain are generated. $p_w^e$, $p_w^n$ and $p_w^c$ denote the class representations for the three classes {"entailment", "neutral", "contradict"} in w, $w \in \{S, T\}$. Class representations may be computed as follows:

$$p_w^j = \frac{1}{k} \sum_{i=1}^{k} \mathrm{RoBERTa}(x_n^j) \quad (1)$$

where $\{x_n^i\}$, $i = 1 \ldots k$, are the labeled k examples for class $j \in e, n, c$ in T or S, $\mathrm{RoBERTa}(\cdot) \in \mathbb{R}^d$ and $p_w^j \in \mathbb{R}^d$.

The method 600 may proceed to block 610, where a query batch loss is generated for each query batch. In some embodiments, block 610 may include blocks 612, 614, and 616. Referring to FIG. 8, at block 612, a source minibatch loss 810 is generated based on losses of queries in the source minibatch 806. At block 614, a target minibatch loss 812 is generated based on losses of queries in the target minibatch 808. At block 616, the query batch loss 814 is generated using the source minibatch loss 810 and the target minibatch loss 812.

The method 600 may proceed to block 818, where the neural network model is optimized using the query batch loss. The method 600 may proceed to block 620, where steps 608 through 618 are performed for each query batch.

The method 600 may proceed to block 622, where the trained neural network model is used to perform an NLP task. The NLP task may be a new task from the target domain or from a new domain different from the target domain and the source domain.

In various embodiments, compared to other neural network models that rely on a standard RoBERTa classifier which consists of a RoBERTa encoder and a logistic regression on the top, UFO-ENTAIL uses a cross-task nearest neighbor block on the top of the RoBERTa encoder to achieve an improved performance Some neural network models that use logistic regression try to learn the target-specific parameters by tuning on the k labeled examples. However, this is very challenging if k is over small, like values {1, 3, 5, 10}. These neural network models that use logistic regression learns class prototypical representations implicitly (i.e., the weights in the logistic regression layer), and, the bias term in the logistic regression layer reflect mainly the distribution in the source S, which is less optimal for predicting in the target T.

In various embodiments, UFO-ENTAIL may be applied to entailment tasks of open domain and open NLP tasks. In some embodiments, to mitigate the potential bias or artifacts in sampling, all numbers of k-shot are averages of five runs in seeds {42, 16, 32, 64, 128}. In some embodiments, only the cross-task nearest neighbor block, the hidden layer and top-5 layers in RoBERTa are updated (e.g., due to GPU memory constraints). Various other training configurations may be used, e.g., based on the available resources.

Various experiments have been performed. Below are the baselines shared by some experiments on open entailment tasks and open NLP tasks.

0-shot. Assuming, zero examples from target domains, a RoBERTa classifier is trained on MNLI, which is applied to the respective test set of target domains without fine-tuning.

Train on k examples. A RoBERTa classifier is built on the k labeled examples from the target domain directly and no MNLI data is used. When k is increased to cover all the labeled examples of the target domain or task, this baseline is referred as "train on target data."

STILTs. This is a learning paradigm: for any target task, first pretrain the model on intermediate tasks, then fine-tune on the target task. Here, it means pretraining on MNLI, then fine-tuning on k examples (k>=1 until it reaches the full labeled data of the target domain/task). When k=0, "STILTS" equals to "0-shot" baseline.

Prototypical Network. It is an episode-training algorithm for few-shot problems.

UFO-ENTAIL in open domains: In some experiments, UFO-ENTAIL is applied in few-shot setting on two out-of-domain entailment datasets: GLUE RTE and SciTail. Examples in GLUE-RTE mainly come from the news and Wikipedia domains. SciTail is from the science domain, designed from the end task of multiple-choice QA. The source dataset MNLI covers a broad range of genres such as conversation, news reports, travel guides, fundraising letters, cultural articles, fiction, etc. RTE has 2,490/277/2,999 examples in train/dev/test; SciTail has 23,596/1,304/2,126 respectively.

UFO-ENTAIL in open NLP tasks: In some experiments, UFO-ENTAIL is applied as a universal framework to other distinct NLP tasks with limited annotations. An alternative approach to handle a task in which the annotations are scarce is to do transfer learning based on existing datasets of rich annotations and high relevance. However, this may result in "training separate models for different tasks," and it may be unrealistic to presume, for T, that a related and rich-annotation dataset always exists. UFO-ENTAIL is used to develop a single machine to solve diverse problems.

TABLE 1

Applying UFO-ENTAIL to two entailment benchmarks (RTE and SciTail) and two other NLP tasks (question answering (QA) and coreference resolution (Coref.)), each providing k examples (k = {1, 3, 5, 10}).

| | | open entailment tasks | | open NLP tasks | |
|---|---|---|---|---|---|
| | #entail-style pairs | RTE (2.5k) | SciTail (23k) | QA (4.8k) | Coref. (4k) |
| | majority or random | 50.16 | 60.40 | 25.00 | 50.00 |
| 0-shot | train on MNLI | 83.36 | 81.70 | 58.00 | 61.76 |
| 1-shot | train on k examp. | 50.02 ± 0.27 | 48.14 ± 8.00 | 25.31 ± 2.56 | 51.14 ± 0.42 |
| | prototype network | 79.17 ± 3.75 | 75.13 ± 7.60 | 68.67 ± 2.69 | 61.91 ± 17.5 |
| | STILTs | 83.86 ± 0.25 | 81.64 ± 0.13 | 63.20 ± 3.55 | 64.31 ± 1.71 |
| | UFO-ENTAIL | 84.76 ± 0.35 | 83.73 ± 1.10 | 71.70 ± 2.55 | 74.20 ± 3.14 |
| 3-shot | train on k examp. | 50.34 ± 0.37 | 46.41 ± 7.98 | 25.33 ± 3.08 | 50.32 ± 0.94 |
| | prototype network | 81.89 ± 1.75 | 80.01 ± 2.66 | 67.90 ± 1.53 | 63.71 ± 21.1 |
| | STILTs | 84.02 ± 0.54 | 81.73 ± 0.23 | 65.28 ± 5.60 | 64.66 ± 2.89 |
| | UFO-ENTAIL | 85.06 ± 0.34 | 83.71 ± 1.17 | 73.06 ± 2.76 | 74.73 ± 2.61 |
| 5-shot | train on k examp. | 50.20 ± 0.23 | 49.24 ± 6.82 | 24.50 ± 2.77 | 50.18 ± 0.85 |
| | prototype network | 81.89 ± 1.08 | 81.48 ± 0.98 | 67.50 ± 2.34 | 73.22 ± 0.78 |
| | STILTs | 84.15 ± 0.47 | 82.26 ± 0.56 | 66.10 ± 6.72 | 68.25 ± 3.49 |
| | UFO-ENTAIL | 84.84 ± 0.61 | 84.82 ± 1.18 | 73.30 ± 2.65 | 74.59 ± 2.87 |
| 10-shot | train on k examp. | 50.53 ± 0.99 | 57.09 ± 4.04 | 25.28 ± 2.35 | 52.55 ± 0.99 |
| | prototype network | 82.12 ± 0.70 | 81.83 ± 0.54 | 68.48 ± 2.40 | 73.28 ± 1.51 |
| | STILTs | 84.08 ± 0.48 | 82.26 ± 0.61 | 67.93 ± 3.31 | 71.08 ± 4.09 |
| | UFO-ENTAIL | 85.28 ± 0.27 | 86.19 ± 1.10 | 74.23 ± 2.48 | 77.58 ± 2.50 |
| full-shot | train on target data | 79.98 ± 0.72 | 95.55 ± 0.14 | 80.47 ± 3.00 | 90.20 ± 0.45 |
| | STILTs (SOTA) | 86.26 ± 0.23 | 95.05 ± 0.19 | 82.60 ± 0.64 | 89.26 ± 0.38 |

Numbers for "STILTS (SOTA)" are upperbound performance while using full labeled data; bold numbers are our top numbers when the few-shot hyperparamter k <= 10.

Table 1 provides the results of the experiments. For each downstream NLP task, k examples are provided for helping the learning of the textual entailment system.

In various embodiments, representative NLP problems are converted to be textual entailment, for which UFO-ENTAIL is applied. This provides a new perspective to tackle these NLP issues, especially given only a small number of labeled examples.

Question Answering (QA). QA setting in which only a small number of labeled examples are provided are handled. A QA problem can be formulated as a textual entailment problem—the document acts as the premise, and the (question, answer candidate), after converting into a natural sentence, acts as the hypothesis. Then a true (resp. false) hypothesis can be translated into a correct (resp. incorrect) answer. QA benchmark MCTest-500 includes an entailment-formatted corpus, which is a set of 500 items (split into 300 train, 50 dev and 150 test). Each item consists of a document, four questions followed by one correct answer, and three incorrect answers. Traditional deep learning has not achieved significant success on it because of the limited training data.

For MCTest benchmark, one question is treated as one example. K-shot means randomly sampling k annotated questions (each corresponds to a short article and has four answer candidates). k entailment pairs for the class "entailment" and 3 k pairs for the class "non-entailment" are obtained. The official evaluation metrics in MCTest include accuracy and $NDCG_4$. Here, we report accuracy.

Coreference Resolution. Coreference resolution aims to cluster the entities and pronouns that refer to the same object. This is a challenging task in NLP, and greatly influences the capability of machines in understanding the text. UFO-ENTAIL is tested on the coreference resolution benchmark GAP, a human-labeled corpus from Wikipedia for recognizing ambiguous pronoun-name coreference. An example from the GAP dataset is shown below:

"McFerran's horse farm was named Glen View. After his death in 1885, John E. Green acquired the farm."

For a specific pronoun in the sentence, GAP provides two entity candidates for it to link. To correctly understand the meaning of this sentence, a machine must know which person ("McFerran" or "John E. Green") the pronoun "his" refers to. GAP has such kind of annotated examples of sizes split as 2 k/454/2 k in train/dev/test. Note that some examples have both entity candidates as negative (201 in train, 62 in dev and 227 in testing).

For UFO-ENTAIL, the coreference resolution problem is transformed into an entailment problem by replacing the pronoun with each entity candidate. For example, the above example will lead to the following two hypotheses:

"McFerran's horse farm was named Glen View. After McFerran's death in 1885, John E. Green acquired the farm." ["entailment"]

"McFerran's horse farm was named Glen View. After John E. Green's death in 1885, John E. Green acquired the farm." ["non-entailment"]

It is noted that in some examples, an "'s" is appended to the person entity string if the pronoun is one of {"his", "His", "her", "Her" }. Otherwise, using the entity string to replace the pronoun directly. Each replacement will yield a hypothesis—the problem ends up being predicting whether this hypothesis is correct or not, given the original sentence.

Randomly choose k examples from train to learn the entailment system; each example will produce two labeled entailment pairs. The GAP benchmark evaluates the F1 score by gender (masculine and feminine) and the overall F1 by combining the two gender-aware F1 scores. We use the official evaluation script and report the overall F1.

Results and Analyses. Table 1 above lists the numbers in k-shot settings (k={1, 3, 5, 10}) and the full-shot competitor which uses the full labeled data of T. To start, the "0-shot" setting, compared with the "majority or random" baseline, indicates that using MNLI as training set and test on various target T has already shown some transferability; but this is far behind the SOTA. Three comparisons are noted below:

First, UFO-ENTAIL is compared with the typical metric-based meta learning approach: prototypical networks. Interestingly, prototypical network is worse than STILTS on the two entailment bench-marks while mostly outperforming STILTS slightly on QA and coreference tasks. UFO-ENTAIL consistently surpasses prototypical networks with big margins. Prototypical network is essentially a nearest neighbor algorithm pretrained on S only. There, a testing example in T searches for its prediction by comparing with the T-specific class representations constructed by the k examples, and as such, a pretrained nearest neighbor algorithm does not necessarily work well if S and T are too distinct.

Second, UFO-ENTAIL is compared with the SOTA technique STILTs in k-shot settings. UFO-ENTAIL outperforms the STILTs across all the tasks. Note that STILTs trains on S and the k examples of T sequentially. What STILTS does is to adapt the pretrained space to the target space, guided by k examples. In contrast, UFO-ENTAIL unifies the RoBERTa encoder and the nearest neighbor algorithm by building cross-task class prototypical representations, then train an unified space on S and T.

Third, UFO-ENTAIL in k-shot settings is compared with the full-shot settings. "Full-shot" has two systems: one pretrains on S then fine-tunes on T, the other fine-tune on T directly. Generally, we notice that pretraining on S can finally promote the performance (e.g., in RTE and QA) or get similar numbers (e.g., in SciTail and Coreference tasks). UFO-ENTAIL by 10-shot even beats the "full-shot, train on target data" with 5.3% in RTE and is very close to the SOTA number by "full-shot STILTS" (85.28 vs. 86.26). In other three tasks (SciTail, QA, Coref.), although UFO-ENTAIL by 10-shot hasn't shown better performance than any full-shot settings, its big improvements over other 10-shot baselines across all the tasks (~4% in SciTail, ~6% in QA and >4% in coreference) demonstrate its superiority of handling open NLP problems in few-shot scenarios.

In these experiments, UFO-ENTAIL for all the reported NLP tasks originated from the same entailment classifier pretrained on MNLI. These experiments indicate that UFO-ENTAIL can deal with open NLP tasks by employing a single entailment system which can generalize well with only a small number of annotated examples per task, instead of building large scale datasets for them separately and let models to fit each of them.

In some embodiments, aspects of the models, systems, and methods can be implemented by textual entailment module 130 and NLP task modules 140*a-c* of computing device 100. Some examples of computing devices, such as computing device 100 may include non-transitory, tangible, machine readable media that include executable code that when run by one or more processors (e.g., processor 110) may cause the one or more processors to perform the processes of methods 300, 500, 600, 700, and 800. Some common forms of machine readable media that may include the processes of methods 300, 500, 600, 700, and 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for using a neural network model for natural language processing (NLP), comprising:
   receiving training data associated with a source domain and a target domain;
   generating one or more query batches,
   wherein a source subquery batch includes one or more source tasks associated with the source domain, and
   wherein a target subquery batch includes one or more target tasks associated with the target domain;
   for each query batch, generating combination class representations associated with a combination of classes in the source domain and the target domain;
   generating a source loss using the source subquery batch and the combination class representations;
   generating a target loss using the target subquery batch and the combination class representations; and
   generating a query batch loss using the source loss and target loss; and
   performing an optimization on the neural network model by adjusting its network parameters based on the query batch loss,
   wherein the optimized neural network model is used to perform one or more new NLP tasks.

2. The method of claim 1, wherein a first new NLP task is from one of the target domain and a new domain, wherein the new domain is different from the source domain and target domain.

3. The method of claim 2, wherein a second new NLP task is from the other of the target domain and the new domain.

4. The method of claim 1, wherein the neural network model includes a textual entailment model,
   wherein the one or more source tasks and the one or more target tasks include one or more textual entailment tasks regarding a relation of a premise sentence including a premise and a hypothesis sentence including a hypothesis, where the relation indicates whether the hypothesis is true given the premise.

5. The method of claim 1, wherein the generating the source loss includes:
   generating a probability distribution by comparing a query of the source subquery batch with the combination class representations; and
   generating the source loss based on the probability distribution.

6. The method of claim 1, wherein the generating the target loss includes:
   generating a probability distribution by comparing a query of the target subquery batch with the combination class representations; and
   generating the target loss based on the probability distribution.

7. The method of claim 1, wherein few-shot learning is performed to the neural network model.

8. A non-transitory machine-readable medium comprising a plurality of machine-readable instructions which, when executed by one or more processors, are adapted to cause the one or more processors to perform a method comprising:
   receiving training data associated with a source domain and a target domain;
   generating one or more query batches,
   wherein a source subquery batch includes one or more source tasks associated with the source domain, and
   wherein a target subquery batch includes one or more target tasks associated with the target domain;
   for each query batch, generating combination class representations associated with a combination of classes in the source domain and the target domain;
   generating a source loss using the source subquery batch and the combination class representations;
   generating a target loss using the target subquery batch and the combination class representations; and
   generating a query batch loss using the source loss and target loss; and
   performing an optimization on the neural network model by adjusting its network parameters based on the query batch loss,
   wherein the optimized neural network model is used to perform one or more new NLP tasks.

9. The non-transitory machine-readable medium of claim 8, wherein a first new NLP task is from one of the target domain and a new domain different from the source domain and target domain.

10. The non-transitory machine-readable medium of claim 9, wherein a second new NLP task is from the other of the target domain and the new domain.

11. The non-transitory machine-readable medium of claim 8, wherein the neural network model includes a textual entailment model,
    wherein the one or more source tasks and one or more target tasks include one or more textual entailment tasks regarding a relation of a premise sentence including a premise and a hypothesis sentence including a hypothesis, where the relation indicates whether the hypothesis is true given the premise.

12. The non-transitory machine-readable medium of claim 8, wherein the generating the source loss includes:
  generating a probability distribution by comparing a query of the source subquery batch with the combination class representations; and
  generating the source loss based on the probability distribution.

13. The non-transitory machine-readable medium of claim 8, wherein the generating the target loss includes:
  generating a probability distribution by comparing a query of the target subquery batch with the combination class representations; and
  generating the target loss based on the probability distribution.

14. The non-transitory machine-readable medium of claim 12, wherein the generating the class representations for each query batch includes:
  generating source sample sets for the classes from the source domain; and
  generating the class representations based on the source sample sets and the target subquery batch.

15. A system, comprising:
  a non-transitory memory; and
  one or more hardware processors coupled to the non-transitory memory and configured to read instructions from the non-transitory memory to cause the system to perform a method comprising:
  receiving training data associated with a source domain and a target domain;
  generating one or more query batches,
    wherein a source subquery batch includes one or more source tasks associated with the source domain, and
    wherein a target subquery batch includes one or more target tasks associated with the target domain;
  for each query batch, generating combination class representations associated with a combination of classes in the source domain and the target domain;
  generating a source loss using the source subquery batch and the combination class representations;
  generating a target loss using the target subquery batch and the combination class representations; and
  generating a query batch loss using the source loss and target loss; and
  performing an optimization on the neural network model by adjusting its network parameters based on the query batch loss,
  wherein the optimized neural network model is used to perform one or more new NLP tasks.

16. The system of claim 15, wherein a first new NLP task is associated with one of the target domain and a new domain, wherein the new domain is different from the source domain and target domain.

17. The system of claim 16, wherein a second new NLP task is associated with the other of the target domain and the new domain.

18. The system of claim 15, wherein the neural network model includes a textual entailment model,
  wherein the one or more source tasks and one or more target tasks include one or more textual entailment tasks regarding a relation of a premise sentence including a premise and a hypothesis sentence including a hypothesis, where the relation indicates whether the hypothesis is true given the premise.

19. The system of claim 15, wherein the generating the source loss includes:
  generating a probability distribution by comparing a query of the source subquery batch with the combination class representations; and
  generating the source loss based on the probability distribution.

20. The system of claim 15, wherein the generating the target loss includes:
  generating a probability distribution by comparing a query of the target subquery batch with the combination class representations; and
  generating the target loss based on the probability distribution.

* * * * *